April 19, 1960     H. P. PHILLIPS ET AL     2,932,871
ANCHORS FOR SAFETY BELTS AND THE LIKE
Filed July 16, 1956
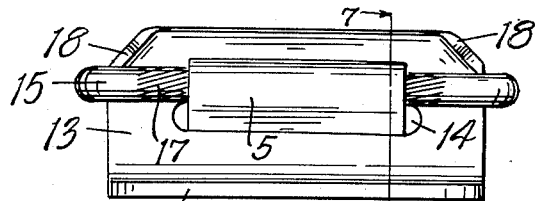
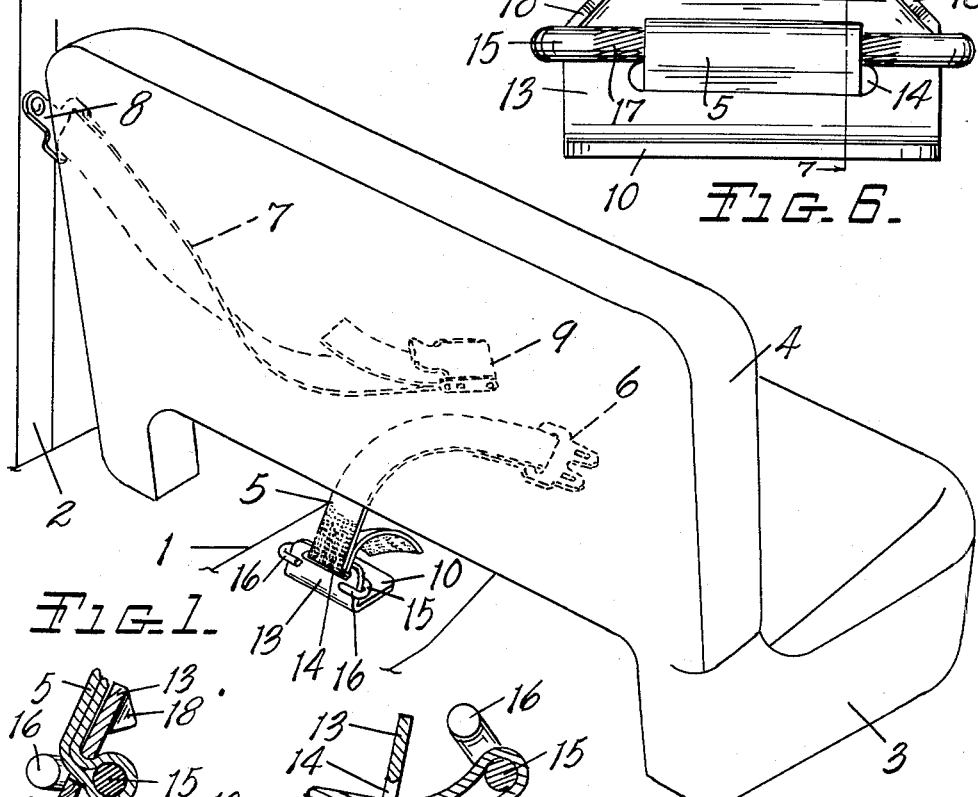
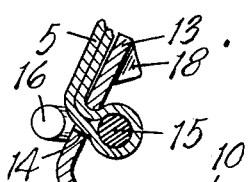
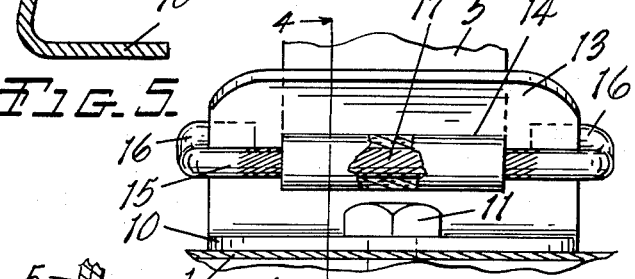
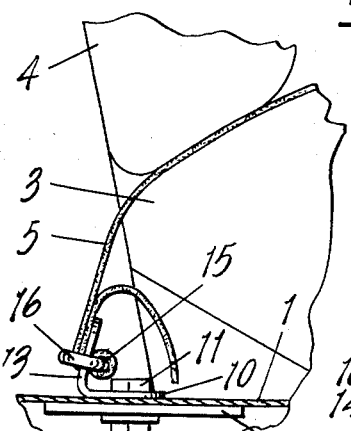
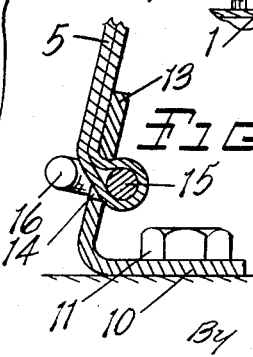
INVENTORS.
Harold P. Phillips
Robert E. Wait
By Otto Q. Earl
Attorney.

United States Patent Office 2,932,871
Patented Apr. 19, 1960

2,932,871

ANCHORS FOR SAFETY BELTS AND THE LIKE

Harold P. Phillips and Robert E. Wait, Hastings, Mich., assignors to Hastings Manufacturing Company, Hastings, Mich.

Application July 16, 1956, Serial No. 598,054

3 Claims. (Cl. 24—136)

This invention relates to anchors for safety belts and the like and is well adapted for attachment to floors or other relatively fixed parts of vehicles.

The main objects of this invention are:

First, to provide an anchor for safety belt straps, or the like, which may be quickly applied to or attached to a supporting part of the vehicle, such as the floor, or an upright part.

Second, to provide an anchoring device which is simple in structure but effective in securing straps, including those formed of plastic or the like, which are slippery in character.

Further objects relating to details and economies of the invention will appear from the description to follow. The invention is defined and pointed out in the claims.

A preferred embodiment of the invention is illustrated in the accompanying drawing, in which:

Fig. 1 is a fragmentary rear view of the anchoring device of our invention installed in operative relation to a seat of an automobile, the floor of which is conventionally illustrated, as is also an upright member.

Fig. 2 is an enlarged fragmentary view partially in vertical section further illustrating the relation of the anchor to the seat and its back.

Fig. 3 is a fragmentary front elevational view of the anchor of our invention, parts being broken away to show structural details, and the floor being shown in section.

Fig. 4 is a fragmentary view in section on a line corresponding to line 4—4 of Fig. 3.

Fig. 5 is a detailed sectional view corresponding to that of Fig. 4, but illustrating certain steps in the engagement of the strap with the anchor.

Fig. 6 is a rear elevational view of a modified form or embodiment of our invention.

Fig. 7 is a fragmentary vertical section on a line corresponding to line 7—7 of Fig. 6.

In the accompanying drawing 1 represents the floor of an automobile, or the like, and 2 an upright. The seat 3 is provided with a back 4. These parts are conventionally shown to illustrate one practical installation of our anchor. The safety belt strap section 5 is also conventionally shown and is provided with a coupling member 6, shown by dotted lines in Fig. 1. The strap section 7 is secured at 8 to the upright member 2 and is provided with a buckle designated generally by the numeral 9 and with which the coupling member 6 may be releasably engaged. The detents of the buckle form no part of this invention and are, therefore, not illustrated or described.

The anchor of our invention comprises the base or attaching plate 10, adapted to rest upon the floor, or other support, and to be attached thereto by the bolt 11.

A reinforcing plate 12 is provided on the underside of the floor 1, the raised portion of the floor adapted to receive the transmission shaft being indicated.

The attaching plate is provided with an upwardly projecting flange 13, preferably positioned on its rear edge and inclined forwardly. This flange has a longitudinal slot 14 therein through which the looped end of the strap 7 may be inserted to receive the snubbing bar 15. The snubbing bar is provided with hooked or looped ends 16 which loosely and slidably engage the flange at the ends thereof. This loose sliding engagement serves the double purpose of allowing the loop in the strap to be passed through the slot and the bar inserted in the loop and hooked end of the bar slipped over the end edges of the flange.

Certain steps in this operation are illustrated in Fig. 5. The bar being loosely engaged with the flange permits the loop being drawn tightly therearound with the bar in supported engagement with the front side of the flange and the strap in snubbing engagement with the bar and with the upper edge of the slot. The bar being freely movable permits this clamping, snubbing engagement.

The intermediate portion 17 of the bar is peripherally knurled, the knurling being of such depth that in effect a multiplicity of tooth-like projections are provided for effective holding engagement with the straps snubbed therearound. Even though the strap is relatively thin, and formed of material which is slippery, such as certain straps formed of plastic, the anchor of our invention is very quickly mounted, the straps quickly attached thereto and adjusted to the desired length.

In the embodiment of our invention shown in Figs. 6 and 7, the flange 13 is provided with lugs 18 at the upper corners thereof which serve to prevent the removal of the snubbing bar 14 from the flange. These stops or lugs 18 prevent accidental or other easy disengagement of the snubbing bar from the flange, although such disengagement is very unlikely to occur.

We have illustrated and described simple and practical embodiments of our invention. We have not attempted to illustrate or describe other adaptations or embodiments which we believe the disclosure will enable those skilled in the art to embody and adapt our invention as may be desired.

Having thus described the invention, what is claimed as new and is desired to be secured by Letters Patent is:

1. In combination with a safety belt strap or the like, of an anchor comprising an attaching plate adapted to be fixedly secured to a supporting member and having an integral upwardly projecting forwardly inclined flange on its rear edge, the flange having an elongated slot extending transversely thereof, and a snubbing bar disposed on the front side of the flange and provided with hooked ends slidably and removably engaging the end edges of the flange, the strap being folded upon itself adjacent an end thereof and the fold disposed through said slot in said flange with the end portion of the strap opposed to the upper edge of the slot and extending upwardly on the rear side of the flange, said snubbing bar being disposed on the front side of the flange and through said loop of said strap, the diameter of the snubbing bar relative to the width of the slot and to the thickness of the strap being such that the strap is snubbingly forced into engagement with both edges of the slot when the strap is under pull stress.

2. In combination with a safety belt strap or the like, of an anchor comprising an attaching plate adapted to be fixedly secured to a supporting member and having an integral upwardly projecting flange, the flange having an elongated slot extending transversely thereof, and a snubbing bar disposed on one side of the flange and removably and slidably engaged therewith, the strap being folded upon itself adjacent an end thereof and the fold disposed through said slot in said flange, with the end portion of the strap opposed to the upper edge of the slot and extending upwardly at the side of the flange opposite that on which the snubbing bar is disposed, said snubbing bar being disposed through said loop of said strap, the width of said slot, the diameter of said snubbing bar and the thickness of said strap relative to each other being such that the strap is snubbingly urged against both longitudinal edges of the slot when the strap is subjected to pull stress.

3. In combination with a safety belt strap or the like, of an anchor comprising an attaching plate adapted to be fixedly secured to a supporting member and having an elongated slot extending transversely thereof, and a snubbing bar disposed on one side of the plate and provided with hooked ends removably and slidably engaging the end edges of the attaching plate, the strap being folded upon itself adjacent an end thereof and the fold disposed through said slot in said plate with the end portion of the strap opposed to the upper edge of the slot and at the side of the plate opposite the side on which the snubbing bar is disposed, said snubbing bar being disposed through said loop of said strap, the diameter of the snubbing bar relative to the width of the slot and to the thickness of the strap being such that the strap is snubbingly engaged with the opposed longitudinal edges of the slot when the strap is under load stress.

References Cited in the file of this patent

UNITED STATES PATENTS

| | | |
|---|---|---|
| 510,358 | Mullane | Dec. 5, 1893 |
| 688,503 | Cross | Dec. 10, 1901 |
| 1,214,052 | Mauzy | Jan. 30, 1917 |
| 1,734,039 | Marinsky | Nov. 5, 1929 |
| 2,492,559 | Dixon | Dec. 27, 1949 |
| 2,516,004 | Kajdan | July 18, 1950 |
| 2,723,631 | Allen | Nov. 15, 1955 |

OTHER REFERENCES

"Ford Field," volume 56, No. 9, pages 16–34, September 1954.